US011372645B2

(12) United States Patent
Poole et al.

(10) Patent No.: US 11,372,645 B2
(45) Date of Patent: Jun. 28, 2022

(54) DEFERRED COMMAND EXECUTION

(71) Applicant: QUALCOMM Incorporated, San Diego, CA (US)

(72) Inventors: Nigel Poole, West Newton, MA (US); Joohi Mittal, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/900,814

(22) Filed: Jun. 12, 2020

(65) Prior Publication Data

US 2021/0389950 A1 Dec. 16, 2021

(51) Int. Cl.
*G06F 9/38* (2018.01)
*G06F 13/28* (2006.01)

(52) U.S. Cl.
CPC .......... *G06F 9/3802* (2013.01); *G06F 9/3836* (2013.01); *G06F 13/28* (2013.01)

(58) Field of Classification Search
None
See application file for complete search history.

(56) References Cited

U.S. PATENT DOCUMENTS

| | | | | |
|---|---|---|---|---|
| 7,010,626 B2* | 3/2006 | Kahle | ...................... | G06F 13/28 710/22 |
| 7,200,689 B2* | 4/2007 | Kahle | ................. | G06F 12/0802 710/22 |
| 7,234,040 B2* | 6/2007 | Berg | ...................... | G06F 9/342 711/213 |
| 7,620,749 B2* | 11/2009 | Biran | ...................... | G06F 13/28 710/22 |
| 7,657,667 B2* | 2/2010 | Johns | ...................... | G06F 13/28 710/22 |
| 8,549,249 B1* | 10/2013 | Metcalf | .................. | G06F 12/02 711/166 |
| 8,874,990 B2* | 10/2014 | Leggette | ............... | H04L 9/3247 714/763 |
| 9,164,679 B2* | 10/2015 | Smith | .................... | G06F 3/0659 |
| 9,208,096 B2* | 12/2015 | Jones | .................... | G06F 12/0862 |
| 10,931,588 B1* | 2/2021 | Matthews | ............... | H04L 47/25 |
| 2003/0120865 A1* | 6/2003 | McDonald | ............ | G06F 3/0658 711/114 |

(Continued)

OTHER PUBLICATIONS

International Search Report and Written Opinion—PCT/US2021/032612—ISA/EPO—dated Jul. 29, 2021.

*Primary Examiner* — Michael Sun
(74) *Attorney, Agent, or Firm* — Procopio, Cory, Hargreaves & Savitch

(57) ABSTRACT

Deferred command execution by a command processor (CP) may be performed based on a determination that at least one command of a primary buffer is located between a first link of the primary buffer and a second link of the primary buffer. The first link and the second link may be to one or more secondary buffers that includes a set of commands. The CP may initiate, before executing, a fetch of a first set of commands in the set of commands based on the first link, a fetch of the at least one command of the primary buffer, and a fetch of a second set of commands in the set of commands based on the second link. After initiating the fetch of the second set of commands, the CP may execute the first set of commands, the at least one command of the primary buffer, and the second set of commands.

22 Claims, 6 Drawing Sheets

(56) References Cited

U.S. PATENT DOCUMENTS

| | | | |
|---|---|---|---|
| 2012/0210095 A1* | 8/2012 | Nellans | G06F 12/10 |
| | | | 711/206 |
| 2014/0032948 A1* | 1/2014 | Kanigicherla | G06F 3/0632 |
| | | | 713/340 |
| 2018/0012328 A1 | 1/2018 | Boles et al. | |
| 2018/0114290 A1* | 4/2018 | Paltashev | G06T 1/20 |

* cited by examiner

DEFERRED COMMAND EXECUTION

BACKGROUND

Technical Field

The present disclosure relates generally to processing systems, and more particularly, to deferred command execution by a command processor (CP).

Introduction

Computing devices often perform graphics processing (e.g., utilizing a graphics processing unit (GPU)) to render graphical data for display by the computing devices. Such computing devices may include, for example, computer workstations, mobile phones such as smartphones, embedded systems, personal computers, tablet computers, and video game consoles. GPUs are configured to execute a graphics processing pipeline that includes one or more processing stages which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A device that provides content for visual presentation on a display may utilize a GPU.

A CP may be configured to execute commands of a command buffer from an on-chip memory after the commands are fetched from a main memory and loaded to the on-chip memory. Due to a period of time required to complete the command fetching process, a time delay may be introduced to a command execution flow. As such, there is a need for improving command fetching techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A CP may be configured to execute commands that are loaded to an on-chip memory from a main memory. For example, commands of a main buffer may be fetched for a first level partition of an on-chip memory, where the commands of the main buffer may need to be executed by the CP according to a flow order of the commands. The main buffer may further include one or more links to one or more secondary buffers that may each include a respective set of commands. Thus, each time the CP identifies a link from the main buffer to a secondary buffer, command execution by the CP may need to be stopped while the commands of the secondary buffer are fetched for a second level partition of the on-chip memory. After the commands of the secondary buffer are loaded on-chip, the CP may resume command execution according to the flow order by proceeding to execute the fetched commands of the secondary buffer. A cumulative time delay caused by stopping command execution each time a link is identified in the flow order may result in significant execution latency for the CP.

Accordingly, the CP may defer execution of commands in the main buffer that are located between a first link in the main buffer and a second link in the main buffer, so that fetching procedures performed with respect to the first link and the second link may be at least partially overlapped in time to reduce execution latency. That is, in order to fetch commands associated with the first link and commands associated with the second link at a same time for the second level partition, commands of the main buffer located between the first link and the second link may need to be deferred/re-fetched for the second level partition between the fetching of the commands for the first link and the fetching of the commands for the second link. In this manner, the commands associated with the first link, the commands of the main buffer, and the commands associated with the second link may be maintained in the second level partition in a correct flow order. Thus, when the commands are executed from the second level partition, the commands are executed in the correct order.

In an aspect of the disclosure, a method, a computer-readable medium, and an apparatus are provided. The apparatus may include a memory and at least one processor coupled to the memory. The at least one processor may be configured to determine that at least one command of a primary buffer is located between a first link of the primary buffer and a second link of the primary buffer. The first link and the second link may be to one or more secondary buffers that includes a set of commands. The at least one processor may be further configured to initiate, before executing, a fetch of a first set of commands in the set of commands based on the first link, a fetch of the at least one command of the primary buffer, and a fetch of a second set of commands in the set of commands based on the second link, and then proceed to execute, after initiating the fetch of the second set of commands, the first set of commands, the at least one command of the primary buffer, and the second set of commands.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
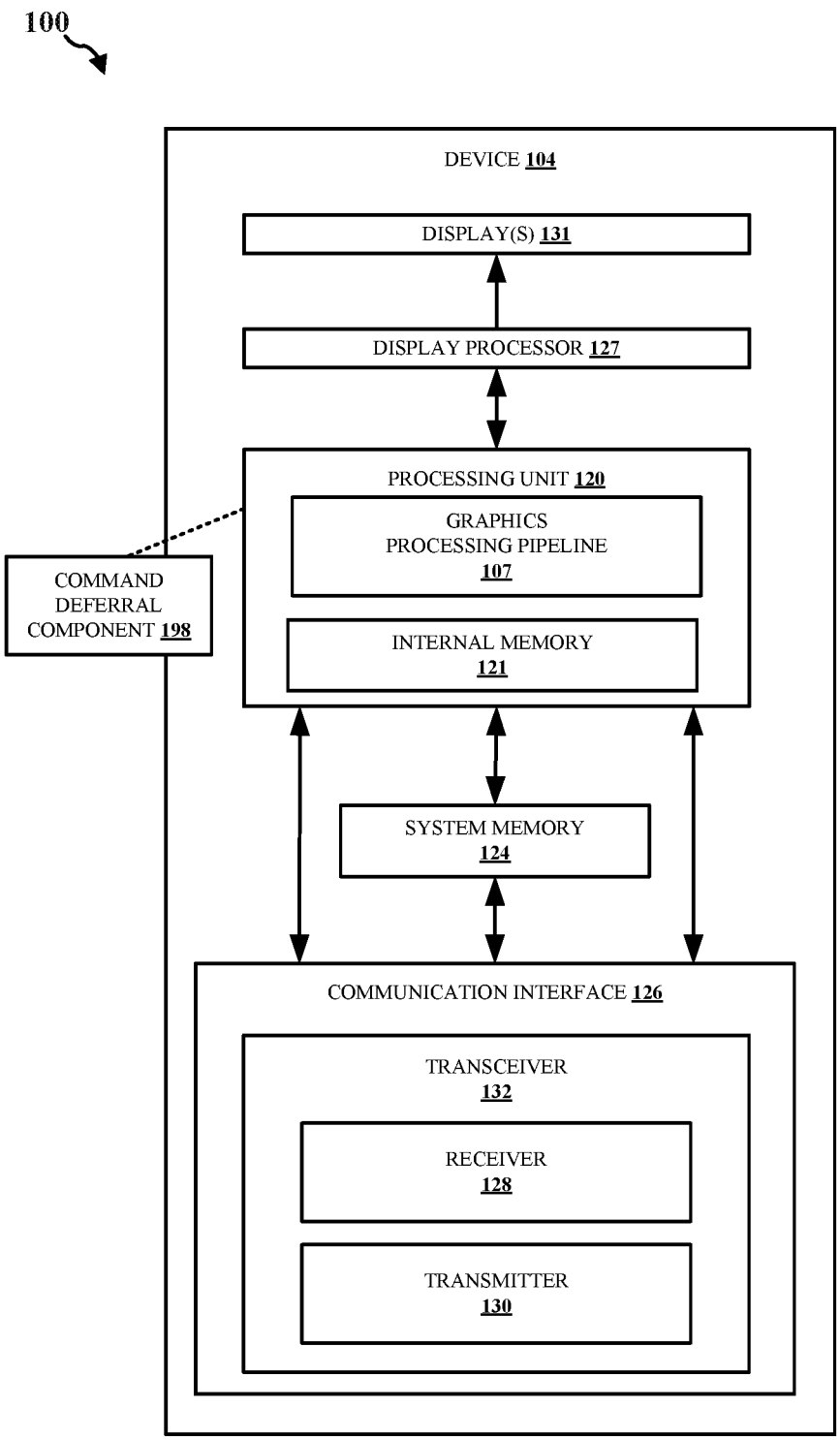
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A CP may be configured to execute commands that are loaded to an on-chip memory from a main memory. For example, commands of a main buffer may be fetched for a first level partition of an on-chip memory, where the commands of the main buffer may need to be executed by the CP according to a flow order of the commands. The main buffer may further include one or more links to one or more secondary buffers that may each include a respective set of commands. Thus, each time the CP identifies a link from the main buffer to a secondary buffer, command execution by the CP may need to be stopped while the commands of the secondary buffer are fetched for a second level partition of the on-chip memory. After the commands of the secondary buffer are loaded on-chip, the CP may resume command execution according to the flow order by proceeding to execute the fetched commands of the secondary buffer. A cumulative time delay caused by stopping command execution each time a link is identified in the flow order may result in significant execution latency for the CP.

Accordingly, the CP may defer execution of commands in the main buffer that are located between a first link in the main buffer and a second link in the main buffer, so that fetching procedures performed with respect to the first link and the second link may be at least partially overlapped in time to reduce execution latency. That is, in order to fetch commands associated with the first link and commands associated with the second link at a same time for the second level partition, commands of the main buffer located between the first link and the second link may need to be deferred/re-fetched for the second level partition between the fetching of the commands for the first link and the fetching of the commands for the second link. In this manner, the commands associated with the first link, the commands of the main buffer, and the commands associated with the second link may be maintained in the second level partition in a correct flow order. Thus, when the commands are executed from the second level partition, the commands are executed in the correct order.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120 and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. In some examples, the device 104 may include a display processor, such as the display processor 127, to perform one or more display processing techniques on one or more frames generated by the processing unit 120 before the frames are displayed by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to the internal memory 121 over the bus or via a different connection. The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a command deferral component 198 configured to determine that at least one command of a primary buffer is located between a first link of the primary buffer and a second link of the primary buffer, the first link and the second link being to one or more secondary buffers that includes a set of commands; initiating, before executing, a fetch of a first set of commands in the set of commands based on the first link, a fetch of the at least one command of the primary buffer, and a fetch of a second set of commands in the set of commands based on the second link; and executing, after initiating the fetch of the second set of commands, the first set of commands, the at least one command of the primary buffer, and the second set of commands. Depiction and reference to the command deferral component 198 as a "component" is for ease of explanation and does not necessarily correspond to a specific hardware component in the processing unit 120. For example, the command deferral component 198 may be configured as code, logic, etc.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

Figure 2:
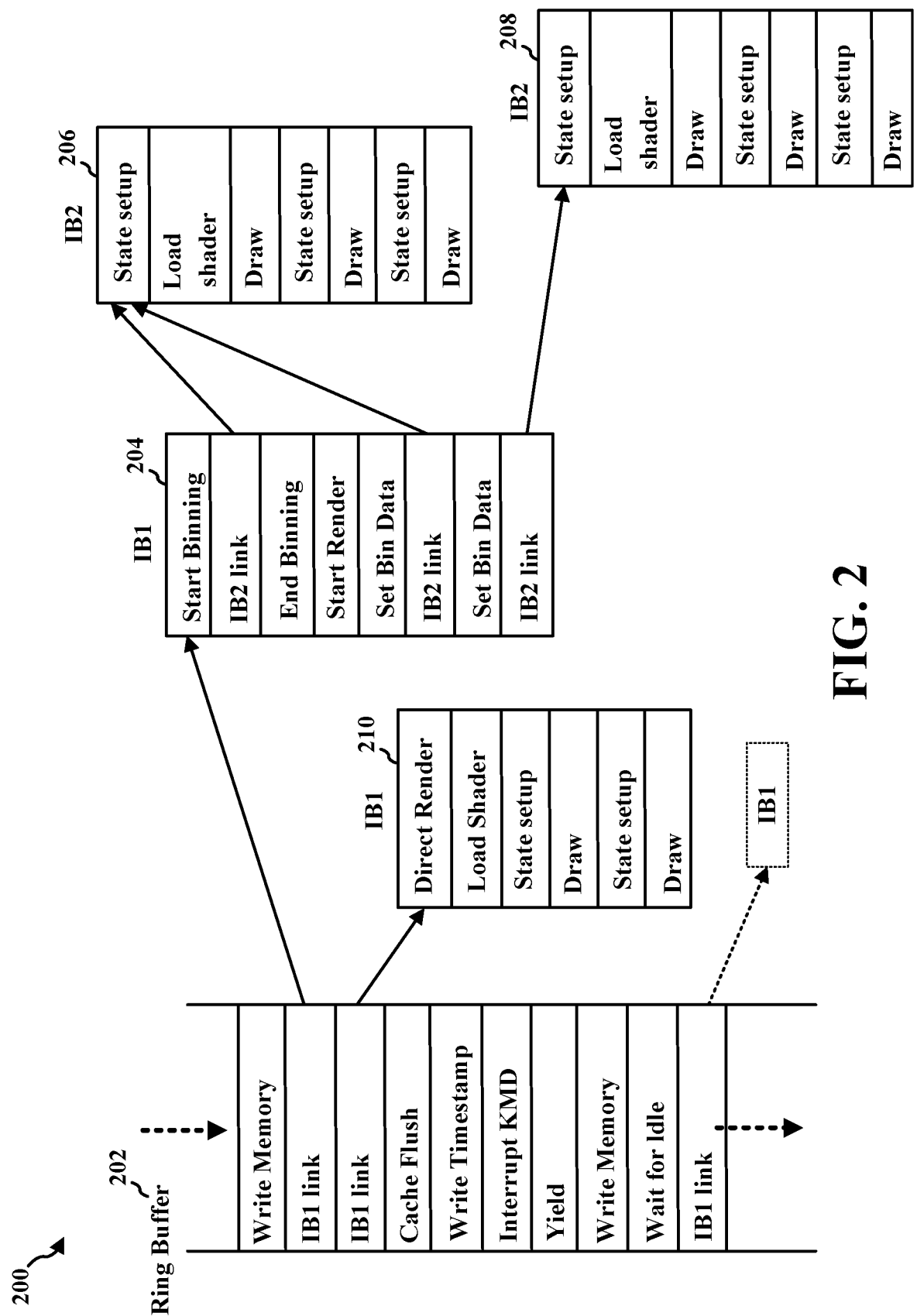
FIG. 2 is a diagram including exemplary command buffers that may be generated by a GPU driver in accordance with one or more techniques of this disclosure.

FIG. 2 is a diagram 200 including exemplary command buffers that may be generated by a GPU driver. A command stream within a memory buffer may include a series of consecutive commands for controlling one or more operations of a GPU. One such command included in the memory buffer may be a link/call to another buffer associated with a next level of buffers. That is, the buffer associated with the next level of buffers may be executed as a subroutine of the buffer from which the call originated. In some configurations, a called buffer may also include a link/call to a further level of buffers such that the calls may be performed across multiple buffer levels in a command execution flow of a command processor (CP). The links/calls may be configured to reduce complexities of the GPU driver by allowing the GPU driver to make use of indirect calls to repeated command sequences included in other buffers.

The commands included in the diagram 200 may be exemplary commands that a GPU driver may generate for the CP to control the one or more operations of the GPU. The corresponding command streams of the buffers, which may be of various lengths, reside in memory and include commands that may need to be executed by the CP in a flow order of the command streams. For example, the flow order of the command stream for a first indirect buffer (IB) of a first buffer level (1) (IB1) 204 may be "start binning," "IB2 link," "end binning," "start render," "set bin data," "IB2 link," "set bin data," "IB2 link." Notably, a link such as the IB2 link in the IB1 204 may be linked to a same or a different buffer (e.g., IB2 206 or IB2 208) as another link in the command stream of the IB1 204.

Accordingly, multiple levels of IBs may be associated with a main ring buffer 202 having a list/stream of commands. The CP may read the commands from the memory and execute the commands according to the flow order. When the CP identifies, based on the flow order, a first IB1 link in the ring buffer 202, the CP may initiate a fetch of the commands associated with the first IB1 204. The CP may execute the commands in the first IB1 204 according to the flow order of the first IB1 204 before returning to the ring buffer 202 to execute a remainder of the commands in the ring buffer 202.

During execution of the commands in the first IB1 204, the CP may identify a second level link in the first IB1 204 to a second level command buffer (e.g., the first IB2 206). The second level link may be utilized to call the first IB2 206 for fetching and executing the commands of the first IB2 206 in accordance with the flow order. Once the CP is finished executing the commands of the first IB2 206, the CP may return to executing a remainder of the commands in the first IB1 204 before further returning to the ring buffer 202 to execute a remainder of the commands in the ring buffer 202.

In examples, additional second level links may be included in the first IB1 204 that may again cause a same IB2 (e.g., the first IB2 206) and/or a different IB2 (e.g., the second IB2 208) to be called for additional commands associated with the second level command buffers. In further examples, the CP may identify further links in an IB2 to further levels of command buffers (e.g., an IB3 (not illustrated)). Accordingly, the flow order of the diagram 200 may be such that the CP executes commands of a command buffer in a listed order of the command buffer unless/until the CP identifies a link to a next level command buffer, in which case the CP may execute commands of the next level command buffer before returning to execute a remainder of the commands at a prior level command buffer. If the CP identifies a second IB1 link in the ring buffer 202 to a second TB1 210, the CP may fetch commands associated with the second IB1 210 before completing execution of the remainder of the commands in the ring buffer 202.

Figure 3:
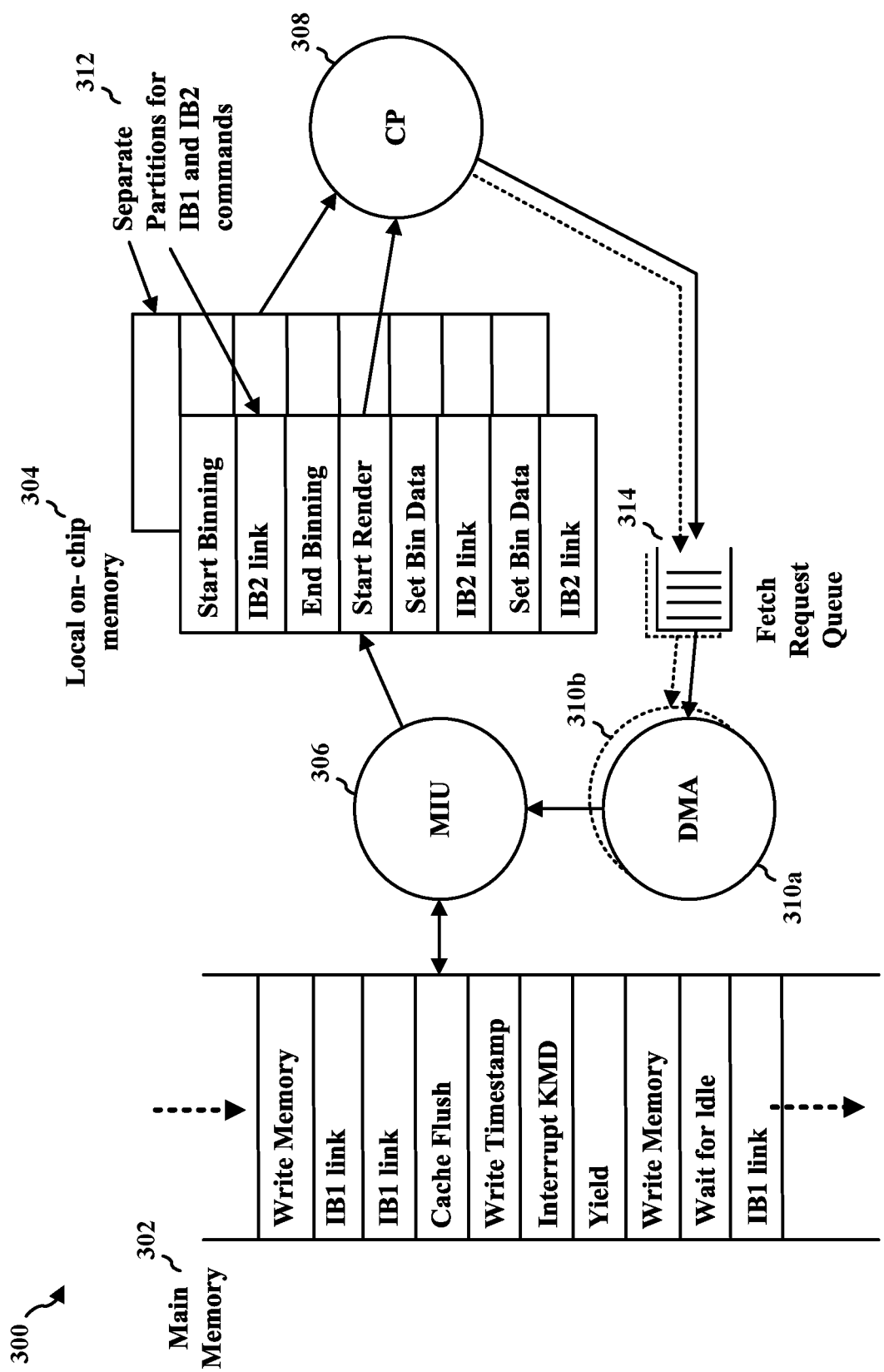
FIG. 3 is a diagram illustrating an exemplary hardware configuration for fetching and executing commands in accordance with one or more techniques of this disclosure.

FIG. 3 is a diagram 300 illustrating an exemplary hardware configuration for fetching and executing commands. The commands may be provided from a main memory 302 to a local on-chip memory 304 via a memory interface unit (MIU) 306. In aspects, the CP 308 may provide a fetch request to a fetch request queue 314 of a direct memory access (DMA) engine 310a-b that causes the command buffer(s) (e.g., IB1 and/or IB2) to be loaded into the on-chip memory 304. The CP 308 may then execute the commands of the command buffer(s) from the on-chip memory 304. Providing the commands to the on-chip memory 304 for execution may reduce a fetch latency of the commands. For example, commands that are located on-chip may be executed more rapidly by the CP 308 than commands that the CP 308 identifies from the main memory 302, which may result in increased fetch latency overhead.

In an example, the CP 308 may request a first DMA engine 310a to fetch the IB1, which may cause the MIU 306 to load the on-chip memory 304 with IB1 data. Accordingly, the CP 308 may then execute the IB1 data locally on-chip. After the CP 308 identifies an IB2 link in the IB1, the CP 308 may indicate the IB2 link to one of the DMA engines 310a-b to cause commands that are pointed to by the IB2 link to be fetched from the main memory 302 and loaded to a separate IB2 partition of the on-chip memory 304. Separate partitions 312 may be utilized for each level of the IBs. Nevertheless, the separate partitions 312 of the on-chip memory 304 may not be loaded with data until the CP 308 identifies, for example, the IB2 link in the IB1 and indicates to one of the DMA engines 310a-b that the data of IB2 is to be fetched. While on-chip information in the IBs may in some cases be executed once, in other cases the information may be preserved for future executions of a same command buffer.

In some configurations, the CP 308 may provide fetch requests to multiple DMA engines (e.g., the first DMA engine 310a and the second DMA engine 310b). The first DMA engine 310a may be a primary DMA engine configured to fetch data from the main memory 302. The second DMA engine 310b may be a secondary DMA engine configured to interpret characteristics of the second level command buffers and determine corresponding memory addresses. The second DMA engine 310b may then provide the memory addresses to the first DMA engine 310a configured to fetch the data from the main memory 302.

When the CP 308 provides fetch requests to the first DMA engine 310a and the second DMA engine 310b, the order in which the fetch requests are provided from the CP 308 may need to be preserved among the DMA engines 310a-b so that data fetched from the main memory 302 may be loaded on-chip in a same order that the data was requested by the CP 308. However, because some level of latency may result from the second DMA engine 310b determining the memory addresses and providing the memory addresses to the first DMA engine 310a, an arrival order of the fetch requests received at the first DMA engine 310a may be different than the order in which the fetch requests were provided from the CP 308. For example, the CP 308 may provide a first fetch request to the second DMA engine 310b and subsequently provide a second fetch request to the first DMA engine 310a. Nevertheless, since the second fetch request may be provided directly from the CP 308 to the first DMA engine 310a with less latency than the first fetch request, which may be provided from the CP 308 to the second DMA engine 310b and then to the first DMA engine 310a, the second fetch request may be received by the first DMA engine 310a before the first fetch request. Thus, the first DMA engine 310a may execute the fetch requests out of order based on the arrival order of the fetch requests at the first DMA engine 310a.

Accordingly, an arbiter token indicative of an order in which the fetch requests are provided from the CP 308 may be identified to determine a correct order for performing the fetch requests from the main memory 302. Before the CP 308 provides a fetch request to either the first DMA engine 310a or the second DMA engine 310b, the CP 308 may request a token from a token generator. In some configurations, tokens may correspond to a list of increasing integers. After receiving the requested token, the CP 308 may provide the token to either the first DMA engine 310a or the second DMA engine 310b along with the fetch request. Each of the DMA engines 310a-b may indicate a value of their respective tokens at a final arbitration stage of the first DMA engine 310a. An arbiter may be configured to determine a token-sequence order of the fetch requests to maintain a fetching order that corresponds to a same order as that for which the fetch requests were provided from the CP 308. As a result, the arbiter may need to hold a fetch request that is received out of order until the token-sequence has advanced to a stage that matches the token number of the held fetch request.

Figure 4:
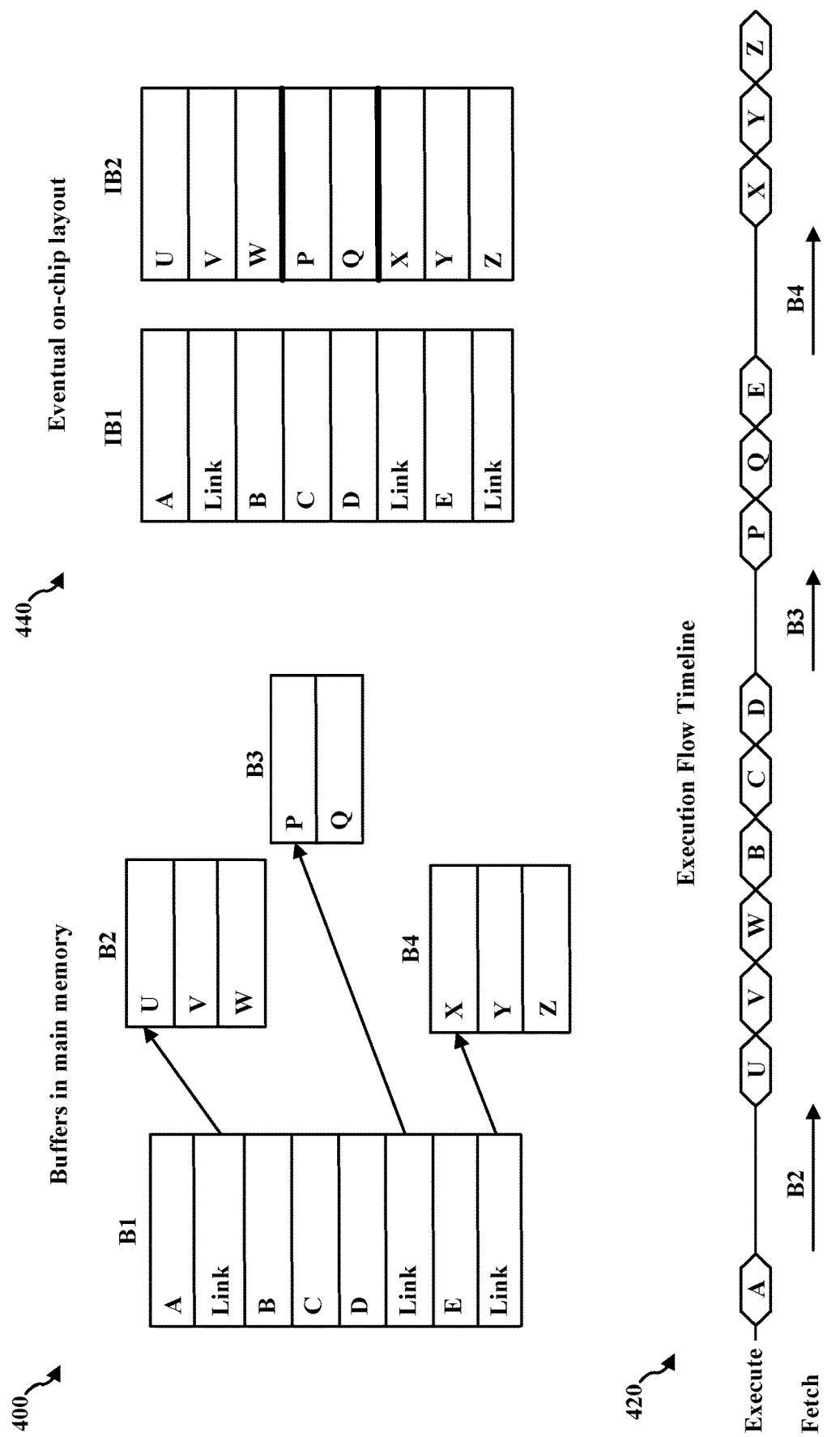
FIG. 4 illustrates a command fetching and execution flow of a CP in accordance with one or more techniques of this disclosure.

FIG. 4 illustrates a command fetching and execution flow of a CP. When the CP executes commands of a command stream, the commands generally need to be executed according to the flow order of all the commands associated with the command stream. Thus, in addition to fetching and executing commands of a primary buffer B1 in the listed order of the command stream, secondary buffers B2, B3, and B4 may need to be fetched by the DMA engine when the CP identifies a corresponding link-command in the primary buffer B1 that points to one of the secondary buffers B2, B3, or B4. Commands associated with the link to one of the secondary buffers B2, B3, or B4 may be executed at a time that an execution flow of the CP has advanced to the link in the command stream of the primary buffer B1 to maintain the flow order indicated by the primary buffer B1.

To execute commands associated with a call performed from one buffer to another buffer (e.g., a call from the primary buffer B1 to one of the secondary buffers B2, B3, or B4), the CP may need to instruct the DMA engine to fetch the called buffer and load the corresponding commands on-chip before the CP may identify the commands of the called buffer for execution. The fetching process may introduce a time delay in the execution flow of the CP that may cause the CP to have to wait for a period of time for the fetched data to arrive on-chip. An increased number of the time delays caused by links/calls to other buffers may result in increased pipeline execution latency that may degrade performance of an associated GPU.

As illustrated in the diagram 400, the buffers B1, B2, B3, and B4 initially may reside in main memory. The buffer B1 may include a first link to a buffer B2, a second link to a buffer B3, and a third link to a buffer B4. A timeline 420 corresponding to the diagram 400 illustrates a progression of the execution flow by the CP. At a starting point of the timeline 420, the buffer B1 may already be loaded to the on-chip memory in an IB1 partition of the diagram 440. An execution row of the timeline 420 may begin with the CP executing command A. The CP may subsequently identify that a link to buffer B2 is the next command in the command stream and instruct the DMA engine to fetch buffer B2.

A fetch row of the timeline 420 illustrates time intervals where the CP may need to wait for commands of the fetched buffers to arrive on-chip from main memory before the commands may be executed by the CP. For example, after the CP executes command A, the CP may need to wait for buffer B2 to be fetched by the DMA engine. Once buffer B2 is received on-chip, the CP may identify and execute commands U, V, and W included in buffer B2. The CP may then determine that execution of buffer B2 is complete and identify for execution a remainder of commands in buffer B1 that are located after the link to buffer B2.

Continuing with the example, the CP may further execute commands B, C, and D in buffer B1 before identifying the second link to buffer B3. The CP may instruct the DMA engine to fetch buffer B3 and wait for a period of time for buffer B3 to be received on-chip from the main memory. After buffer B3 is loaded on-chip, the CP may execute commands P and Q included in buffer B3 before again returning to buffer B1 to identify and execute command E that follows the second link to buffer B3. Next, the CP may further identify the third link to buffer B4, instruct the DMA engine to fetch buffer B4, wait for another period of time for buffer B4 to be received on-chip from the main memory, and execute commands X, Y, and Z included in buffer B4. As such, execution of the entire flow order associated with buffer B1 may be completed via the CP providing instructions to the DMA engine to fetch the secondary buffers B2, B3, and B4 as the CP respectively identifies each link to the secondary buffers B2, B3, and B4 in the command stream of buffer B1.

The diagram 440 illustrates an eventual on-chip layout of the exemplary data included in the on-chip memory at a conclusion of the execution flow timeline 420. The on-chip layout may include a first partition IB1 and a second partition IB2. Commands of the first level buffer B1 may be included in the first partition IB1 and commands of each of the second level buffers B2, B3, and B4 may be included in the second partition IB2. For example, the commands of buffers B2, B3, and B4 may fill the second partition IB2 according to the flow order, albeit based on interleaved waiting periods associated with respectively fetching the buffers B2, B3, and B4 from the main memory. If the flow order were to include further levels of buffers, the on-chip layout may be expanded to include further levels of partitions (e.g., a third partition IB3 (not illustrated)).

Figure 5:
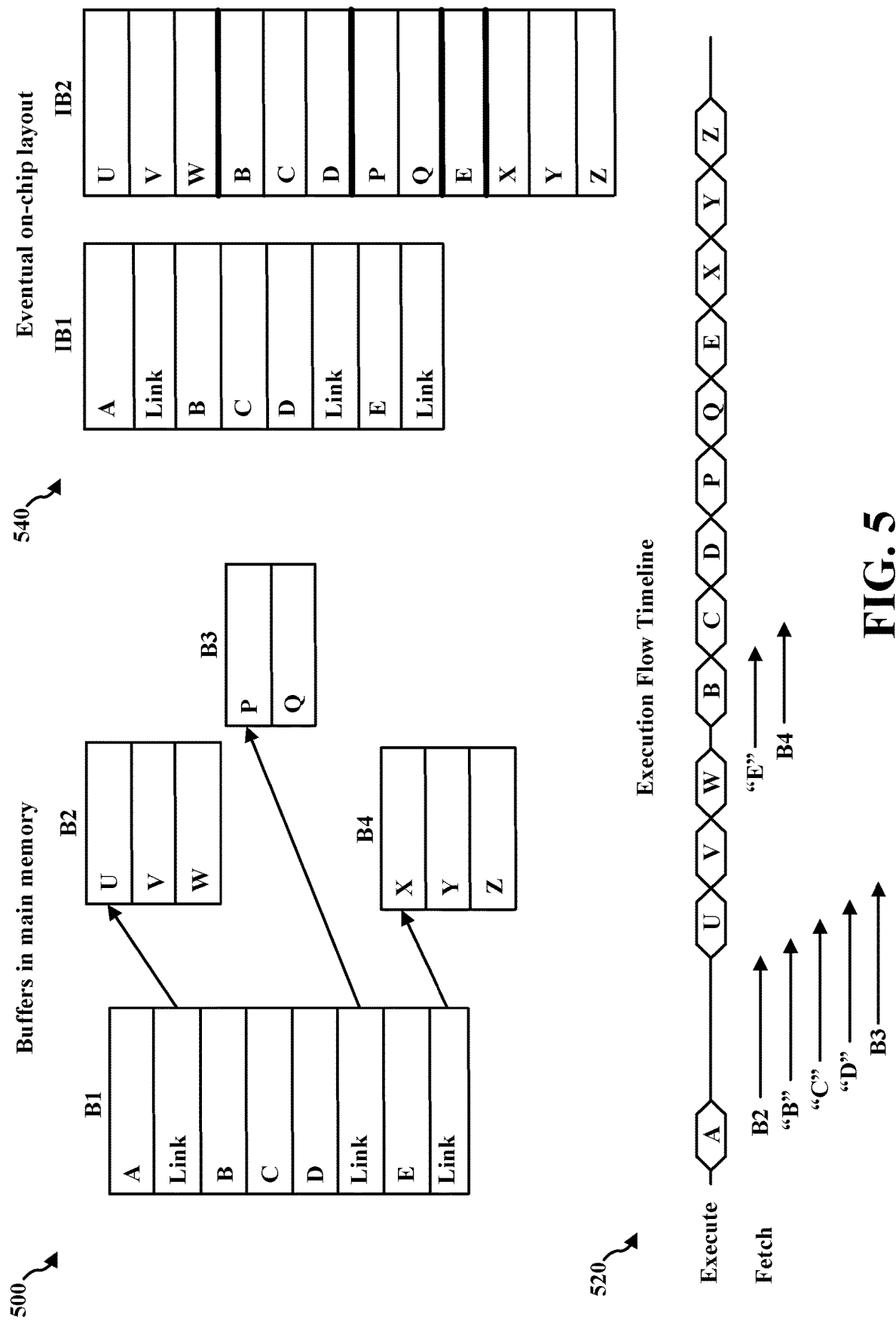
FIG. 5 illustrates a command fetching and execution flow of a CP based on deferred command execution in accordance with one or more techniques of this disclosure.

FIG. 5 illustrates a command fetching and execution flow of a CP based on deferred command execution. In certain aspects, the GPU driver may form a buffer/command stream that includes consecutive link-commands to one or more IBs. When the CP identifies a first link to an IB in the command stream, the CP may determine a number of consecutive commands in the command stream that immediately follow the first link to the IB that also include a link-command to the one or more IBs. The CP may instruct the DMA engine to pre-fetch, one after the other, the buffer(s) that correspond to the consecutive link-commands, so that a next buffer may be already loaded on-chip for execution at a time that execution of a preceding buffer is complete.

While concurrent buffer fetching may not hide a fetch latency of a first buffer fetch in the concurrent buffer fetches, a fetch latency of a second buffer fetch and subsequent buffer fetches may be at least partially hidden by a time overlap of the buffer fetches. That is, initiating pre-fetches of the first buffer and the second buffer one after the other (e.g., initiating the second buffer fetch before the first buffer fetch is complete but after the first buffer fetch is initiated) may not cause the execution flow order to result in out of order execution, as commands associated with the buffer fetches may still be loaded on-chip according to the flow order. Nevertheless, the GPU driver may not always provide a buffer that includes consecutively arranged link-commands in the command stream. In some configurations, the buffer provided by the GPU driver may include at least one command located between a set of links in the command stream. Thus, concurrently fetching the buffers associated with the set of links may result in out of order execution, if the buffer associated with the second link is fetched before the commands in the flow order that need to be executed between the first link and the second link.

For a command steam that includes a flow order of a first link, a command, and a second link, the CP may execute the first link to load first IB2 commands to a local on-chip storage. The CP may subsequently defer IB1 commands that are located between the first link and the second link by instructing the DMA engine to re-fetch/load such commands to a same local on-chip storage after the first IB2 commands. The CP may then execute the second link to load second IB2 commands to the same local on-chip storage after the re-fetched IB1 commands. In this manner, the fetching of the buffer associated with the second link may now share a time overlap with the fetching of the buffer associated with the first link when the re-fetching of the IB1 commands is initiated between initiations of the fetches for the first link and the second link. That is, initiating pre-fetches of the first buffer, the re-fetched IB1 commands, and the second buffer, one after the other for the same local on-chip storage, may not cause the execution flow order to result in out of order execution, as the buffer fetches and the deferred commands may still be loaded on-chip and executed from IB2 according to the proper flow order.

In the diagram 500, the buffers B1, B2, B3, and B4 may be stored in main memory similar to the buffers of the diagram 400. The buffer B1 may include a first link to a buffer B2, a second link to a buffer B3, and a third link to a buffer B4. Assuming that at a starting point of an execution flow timeline 520 the buffer B1 is already loaded to the on-chip memory, the CP may begin the execution flow with execution of command A.

When the CP identifies the first link in buffer B1 to buffer B2, the CP may instruct the DMA engine to fetch buffer B2 and load the commands of buffer B2 (e.g., commands U, V, and W) on-chip in IB2 of the diagram 540. However, rather than immediately executing commands U, V, and W from IB2, the CP may further identify and defer commands in buffer B1 (e.g., commands B, C, and D) that are between the first link to buffer B2 and the second link to buffer B3. Thus, the CP may instruct the DMA engine to re-fetch commands B, C, and D that were previously fetched for IB1 and add the commands B, C, and D to IB2 immediately after the commands U, V, and W that were fetched for buffer B2. By deferring/re-fetching commands B, C, and D from buffer B1 and executing them from IB2 at a later time, the CP may reduce latency by instructing the DMA engine to additionally fetch buffer B3 in the required flow order while buffer B2 and/or the re-fetched commands B, C, and D are still being loaded on-chip. In this manner, the CP may not have to wait for buffer B2 to be entirely loaded on-chip before the fetching of buffer B3 may begin. Instead, the fetches in the timeline 520 may be overlapped in accordance with a pipeline that maintains the required flow order for fetching and executing the commands.

The overlapping fetches of the timeline 520 may be initiated/queued one after the other based on a waiting period for the buffer B2 to be retrieved from the main memory. Once buffer B2 has been loaded to the on-chip memory, the CP may begin executing the commands of buffer B2 (e.g., commands U, V, and W) from IB2. After the commands of buffer B2 are executed, the DMA engine may have already re-fetched the deferred commands of buffer B1 (e.g., commands B, C, and D), so that the deferred commands may be executed from IB2 in the required flow order. Similarly, after the deferred commands of buffer B1 are executed, the DMA engine may have already loaded the commands of buffer B3 to the on-chip memory, such that the commands of buffer B3 (e.g., commands P and Q) may be executed with reduced latency, as the fetching of buffer B3 may be at least partially overlapped in time with the fetching of buffer B2.

In aspects where a buffer is much longer than the buffer B1 illustrated in the diagram 500, there may be many links/second level buffers included in the buffer. Thus, a number of the links/next level buffers that may be pre-fetched at a time may be limited to a certain threshold. For example, pre-fetch traffic may be limited to two outstanding/ pending buffer pre-fetches per level to interweave prefetching operations with execution operations. In other examples, the number of outstanding pre-fetches may be limited to three or more, depending on a length of time required to fetch the data. For example, a longer fetch time may indicate that more outstanding pre-fetches may be used for latency hiding. In aspects where the buffer includes consecutive links with no commands in between such links, the consecutive links may be counted together as one pre-fetch since there are no commands located between the consecutive links that need to be deferred (e.g., 5 consecutive/adjacent links in a buffer may be fetched and counted together as only one outstanding pre-fetch).

Following execution of a last command in an oldest outstanding buffer pre-fetch (e.g., command W in buffer B2), other commands up to and including a link-command to a next buffer (e.g., re-fetched command E and buffer B4) may be pre-fetched to maintain the outstanding number of buffer pre-fetches at two pre-fetches. In this manner, the CP may not have to wait for buffer B4 to be loaded on-chip, as the buffer B4 may already be included in IB2 by the time the CP finishes execution of the re-fetched command E and/or execution of the commands P and Q of the buffer B3.

Figure 6:
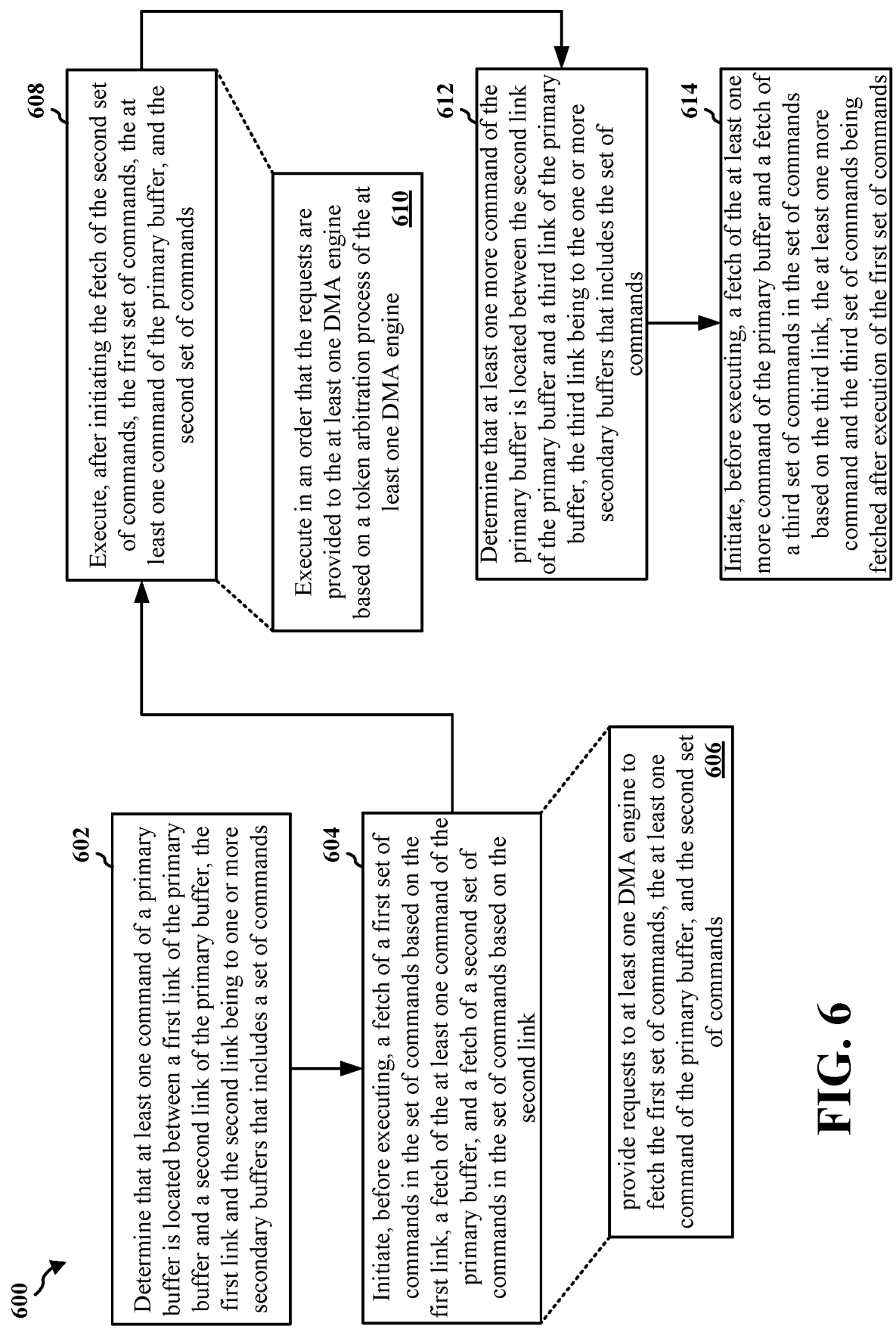
FIG. 6 is a flowchart of an example method of fetching and executing commands in accordance with one or more techniques of this disclosure.

FIG. 6 is a flowchart 600 of an example method of fetching and executing commands in accordance with one or more techniques of this disclosure. The method illustrated in the flowchart 600 may be performed by a CP, a GPU, an apparatus such as a wireless communication device, and the like, as used in connection with the examples of FIGS. 1-5.

At 602, a CP may determine that at least one command of a primary buffer is located between a first link of the primary buffer and a second link of the primary buffer, the first link and the second link being to one or more secondary buffers that includes a set of commands. For example, referring to FIGS. 3 and 5, the CP 308 may determine that commands B, C, and D of the primary buffer B1 are located between a first link to buffer B2 and a second link to buffer B3. The secondary buffers B2, B3, and B4 may include a set of commands (e.g., U, V, W, P, Q, X, Y, and Z).

At 604, the CP may initiate, before executing, a fetch of a first set of commands in the set of commands based on the first link, a fetch of the at least one command of the primary buffer, and a fetch of a second set of commands in the set of commands based on the second link. For example, referring to FIGS. 3 and 5, the CP 308 may initiate a fetch of the commands U, V, and W based on the first link to buffer B2, a fetch of the commands B, C, and D of the primary buffer B1, and a fetch of the commands P and Q based on the second link to buffer B3, the fetches being performed based on a flow order.

Each of the first set of commands (e.g., U, V, and W) and the second set of commands (e.g., P and Q) may be pre-fetched from the set of commands (e.g., U, V, W, P, Q, X, Y, and Z). The first set of commands and the second set of commands may be pre-fetched based on a maximum number of pending pre-fetches. For example, in the timeline 520, the pre-fetches for B2 and B3 may be pending at a same time if the maximum number of pending pre-fetches is equal to or greater than 2. The maximum number of pending pre-fetches may be determined for a buffer level. For example, the maximum number of pending pre-fetches may be determined at the primary buffer level including the primary buffer B1 or the maximum number of pending pre-fetches may be determined at the secondary buffer level including the secondary buffers B2, B3, and B4. Consecutive links in the primary buffer B1 (or consecutive links in the secondary buffers B2, B3, and B4) may be counted as one pre-fetch in the maximum number of pending pre-fetches. The maximum number of pending pre-fetches may be based on a time period for the pre-fetches to be received on-chip from a main memory.

The primary buffer (e.g., the buffer B1) may be fetched for a first memory partition (e.g., IB1). Furthermore, the first set of commands (e.g., U, V, and W), the at least one command of the primary buffer (e.g., B, C, and D of the buffer B1), and the second set of commands (e.g., P and Q) may be fetched for and executed from a second memory partition (e.g., IB2). The at least one command (e.g., B, C, and D) may be initially fetched for the first memory partition (e.g., IB1) and the at least one command (e.g., B, C, and D) may be re-fetched for the second memory partition (e.g., IB2).

At 606, to initiate the fetches, the CP may provide requests to at least one DMA engine to fetch the first set of commands, the at least one command of the primary buffer, and the second set of commands, based on the determination that the at least one command of the primary buffer is located between the first link and the second link. For example, referring to FIGS. 3 and 5, the CP 308 may provide requests to at least one of the DMA engines 310a-b to fetch commands U, V, and W of the buffer B2, commands B, C, and D of the buffer B1, and commands P and Q of the buffer B3, based on a determination that commands B, C, and D of the buffer B1 are located between the first link to buffer B2 and the second link to buffer B3.

At 608, the CP may execute, after initiating the fetch of the second set of commands, the first set of commands, the at least one command of the primary buffer, and the second set of commands. For example, referring to FIGS. 3 and 5, the CP 308 may execute in order from the on-chip partition IB2, the commands (U, V, W), (B, C, D) and (P, Q).

At 610, the first set of commands, the at least one command of the primary buffer, and the second set of commands may be executed in an order that the requests are provided to the at least one DMA engine based on a token arbitration process of the at least one DMA engine. For example, referring to FIGS. 3 and 5, commands U, V, and W of the buffer B2, command B, C, and D of the buffer B1, and commands P and Q of the buffer B3 may be executed in an order that the requests are provided to the DMA engines 310a-b based on a token-based arbitration process of the DMA engines 310a-b.

At 612, the CP may determine that at least one more command of the primary buffer is located between the second link of the primary buffer and a third link of the primary buffer, the third link being to the one or more secondary buffers that includes the set of commands. For example, referring to FIGS. 3 and 5, the CP 308 may determine that command E of the primary buffer B1 is located between the second link to buffer B3 and a third link to buffer B4.

At 614, the CP may initiate, before executing, a fetch of the at least one more command of the primary buffer and a fetch of a third set of commands in the set of commands based on the third link, the at least one more command and the third set of commands being fetched after execution of the first set of commands. For example, referring to FIGS. 3 and 5, the CP 308 may initiate a fetch of the command E of the primary buffer B1 and a fetch of the commands X, Y, and Z based on a third link to buffer B4, the fetches being provided on-chip based on the flow order. In examples, if the maximum number of pending pre-fetches is 2, the fetching of command E and buffer B4 may occur after the first set of commands U, V, and W for buffer B2 is no longer pending (e.g., after commands U, V, and W are executed).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

Various examples have been described. These and other examples are within the scope of the following claims.

What is claimed is:

1. A method of fetching and executing commands, comprising:
    determining that at least one command of a primary buffer is located between a first link of the primary buffer and a second link of the primary buffer, the second link being separated from the first link of the primary buffer by the at least one command, the first link and the second link being to one or more secondary buffers that includes a set of commands;
    initiating, before executing, a fetch of a first set of commands in the set of commands based on the first link, a fetch of the at least one command of the primary buffer, and a fetch of a second set of commands in the set of commands based on the second link; and
    executing, after initiating the fetch of the second set of commands, the first set of commands, the at least one command of the primary buffer, and the second set of commands.

2. The method of claim 1, further comprising:
    determining that at least one more command of the primary buffer is located between the second link of the primary buffer and a third link of the primary buffer, the third link being to the one or more secondary buffers that includes the set of commands; and
    initiating, before executing, the fetch of the at least one more command of the primary buffer and a fetch of a third set of commands in the set of commands based on the third link, the at least one more command and the third set of commands being fetched after execution of the first set of commands.

3. The method of claim 1, wherein each of the first set of commands and the second set of commands are pre-fetched from the set of commands, the first set of commands and the second set of commands being pre-fetched based on a maximum number of pending pre-fetches.

4. The method of claim 3, wherein consecutive links in the primary buffer are counted as one pre-fetch in the maximum number of pending pre-fetches.

5. The method of claim 3, wherein the maximum number of pending pre-fetches is determined for a buffer level.

6. The method of claim 3, wherein the maximum number of pending pre-fetches is based on a time period for the pre-fetches to be received on-chip from a main memory.

7. The method of claim 1, wherein initiating the fetches further comprises providing requests to at least one direct memory access (DMA) engine to fetch the first set of commands, the at least one command of the primary buffer, and the second set of commands, based on the determination that the at least one command of the primary buffer is located between the first link and the second link.

8. The method of claim 7, wherein the first set of commands, the at least one command of the primary buffer, and the second set of commands are executed in an order that the requests are provided to the at least one DMA engine based on a token arbitration process of the at least one DMA engine.

9. The method of claim 1, wherein the primary buffer is fetched for a first memory partition, and wherein the first set of commands, the at least one command of the primary buffer, and the second set of commands is fetched for and executed from a second memory partition.

10. The method of claim 1, wherein the at least one command is initially fetched for a first memory partition, and wherein the at least one command is re-fetched for a second memory partition.

11. An apparatus for fetching and executing commands, comprising:
a memory; and
at least one processor coupled to the memory and configured to:
determine that at least one command of a primary buffer is located between a first link of the primary buffer and a second link of the primary buffer, the second link being separated from the first link of the primary buffer by the at least one command, the first link and the second link being to one or more secondary buffers that includes a set of commands;
initiate, before executing, a fetch of a first set of commands in the set of commands based on the first link, a fetch of the at least one command of the primary buffer, and a fetch of a second set of commands in the set of commands based on the second link; and
execute, after initiating the fetch of the second set of commands, the first set of commands, the at least one command of the primary buffer, and the second set of commands.

12. The apparatus of claim 11, wherein the at least one processor is further configured to:
determine that at least one more command of the primary buffer is located between the second link of the primary buffer and a third link of the primary buffer, the third link being to the one or more secondary buffers that includes the set of commands; and
initiate, before executing, the fetch of the at least one more command of the primary buffer and a fetch of a third set of commands in the set of commands based on the third link, the at least one more command and the third set of commands being fetched after execution of the first set of commands.

13. The apparatus of claim 11, wherein each of the first set of commands and the second set of commands are pre-fetched from the set of commands, the first set of commands and the second set of commands being pre-fetched based on a maximum number of pending pre-fetches.

14. The apparatus of claim 13, wherein consecutive links in the primary buffer are counted as one pre-fetch in the maximum number of pending pre-fetches.

15. The apparatus of claim 13, wherein the maximum number of pending pre-fetches is determined for a buffer level.

16. The apparatus of claim 13, wherein the maximum number of pending pre-fetches is based on a time period for the pre-fetches to be received on-chip from a main memory.

17. The apparatus of claim 11, wherein to initiate the fetches the at least one processor is further configured to provide requests to at least one direct memory access (DMA) engine to fetch the first set of commands, the at least one command of the primary buffer, and the second set of commands, based on the determination that the at least one command of the primary buffer is located between the first link and the second link.

18. The apparatus of claim 17, wherein the first set of commands, the at least one command of the primary buffer, and the second set of commands are executed in an order that the requests are provided to the at least one DMA engine based on a token arbitration process of the at least one DMA engine.

19. The apparatus of claim 11, wherein the primary buffer is fetched for a first memory partition, and wherein the first set of commands, the at least one command of the primary buffer, and the second set of commands is fetched for and executed from a second memory partition.

20. The apparatus of claim 11, wherein the at least one command is initially fetched for a first memory partition, and wherein the at least one command is re-fetched for a second memory partition.

21. The apparatus of claim 11, wherein the apparatus is a wireless communication device.

22. A non-transitory computer-readable medium storing computer executable code, the code when executed by at least one processor of a graphics processing unit (GPU), causes the at least one processor to:
determine that at least one command of a primary buffer is located between a first link of the primary buffer and a second link of the primary buffer, the second link being separated from the first link of the primary buffer by the at least one command, the first link and the second link being to one or more secondary buffers that includes a set of commands;
initiate, before executing, a fetch of a first set of commands in the set of commands based on the first link, a fetch of the at least one command of the primary buffer, and a fetch of a second set of commands in the set of commands based on the second link; and
execute, after initiating the fetch of the second set of commands, the first set of commands, the at least one command of the primary buffer, and the second set of commands.

* * * * *